United States Patent
Silverman et al.

(10) Patent No.: US 7,382,758 B2
(45) Date of Patent: Jun. 3, 2008

(54) MEDIUM ACCESS CONTROL FOR SIMULTANEOUS CHANNEL COMMUNICATIONS

(75) Inventors: Shmuel Silverman, Buffalo Grove, IL (US); Randy L. Ekl, Lake Zurich, IL (US); Robert D. LoGalbo, Hoffman Estates, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 778 days.

(21) Appl. No.: 10/999,759

(22) Filed: Nov. 30, 2004

(65) Prior Publication Data

US 2006/0114941 A1 Jun. 1, 2006

(51) Int. Cl.
*H04Q 7/28* (2006.01)

(52) U.S. Cl. .................................... 370/338

(58) Field of Classification Search .................... None
See application file for complete search history.

(56) References Cited

U.S. PATENT DOCUMENTS

| | | | | |
|---|---|---|---|---|
| 5,621,732 | A * | 4/1997 | Osawa | 370/346 |
| 6,862,456 | B2 * | 3/2005 | Sugar et al. | 455/503 |
| 2002/0168979 | A1 | 11/2002 | Walke et al. | |
| 2004/0042424 | A1 * | 3/2004 | Hsien-Tsung | 370/328 |
| 2004/0157604 | A1 | 8/2004 | Sharony et al. | |
| 2004/0166848 | A1 | 8/2004 | Backes et al. | |
| 2004/0192300 | A1 | 9/2004 | Backes et al. | |

OTHER PUBLICATIONS

Jian et al, A Mutlichannel CSMA MAC Protocol with Receiver-Based Channel Selection for Multihop Wirless Networks, pp. 432-439, 2001, downloadable at www.citeseer.ist.psu.edu/457597.htm.*

* cited by examiner

*Primary Examiner*—Frank Duong
(74) *Attorney, Agent, or Firm*—Randi L. Karpinia

(57) ABSTRACT

A method and system for wireless data transmission between at least three stations use multiple frequency bands for simultaneous channel communications. The method includes transmitting a Request To Send (RTS) packet from a first station to an intermediate second station over a first frequency band. Two Clear To Send (CTS) packets, which CTS packets include transmission timing information, are then transmitted from the second station simultaneously both to the first station and to a third station. The CTS packet sent to the first station is transmitted over the first frequency band and the CTS packet sent to the third station is transmitted over a second frequency band. A data packet from the first station is then transmitted to the second station. The third station suspends, based on the transmission timing information included in the CTS packets, any unicast transmission to the second station during the transmission of the data packet from the first station to the second station.

22 Claims, 6 Drawing Sheets

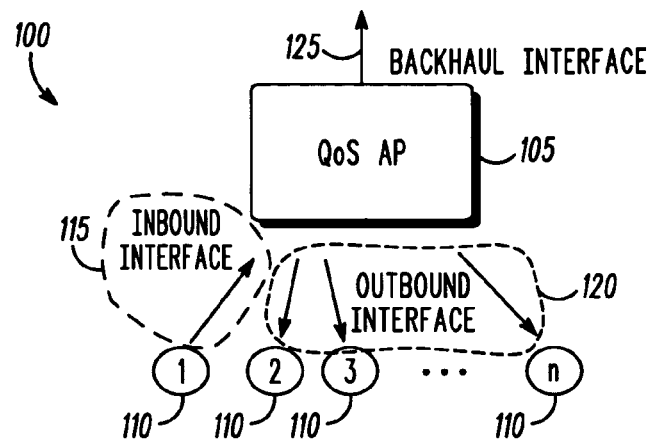
FIG. 1
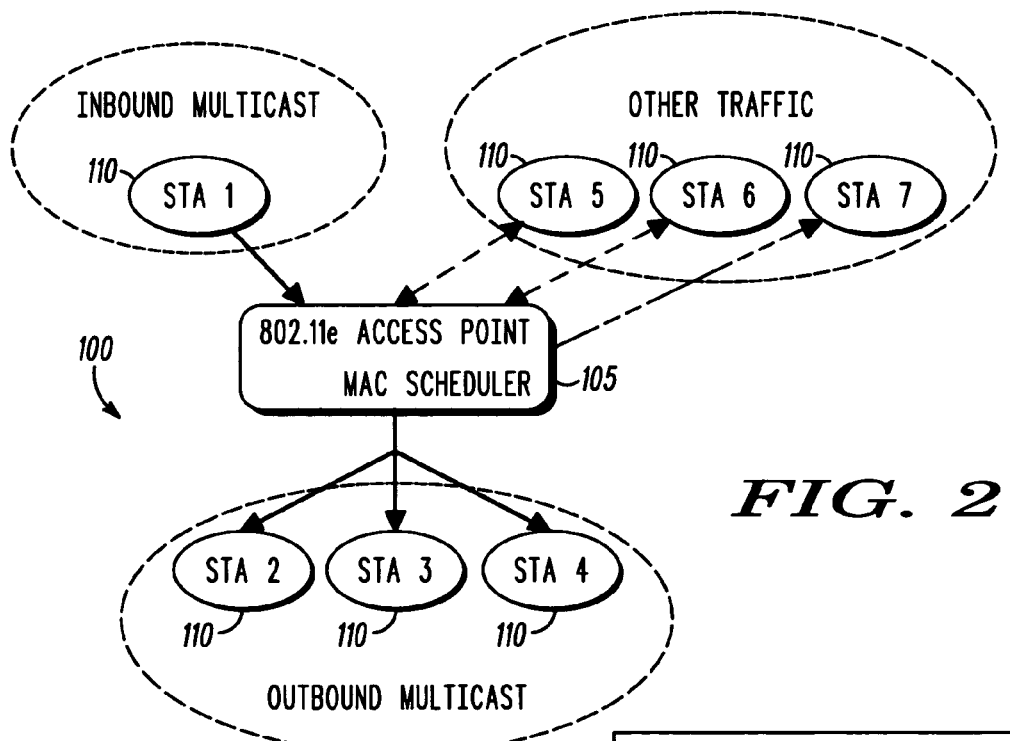
FIG. 2
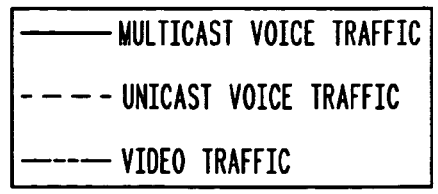

MEDIUM ACCESS CONTROL FOR SIMULTANEOUS CHANNEL COMMUNICATIONS

BACKGROUND OF THE INVENTION

1. Field of the Invention

The present invention relates generally to medium access control in wireless networks, and in particular to simultaneous half-duplex channel communications.

2. Description of Prior Art

Wireless Local Area Network (WLAN) protocols such as those based on the IEEE 802.11 standards are designed to recreate the high Quality of Service (QoS) that is typically supplied in wired networks that use standard LAN protocols such as Ethernet. High QoS includes uninterrupted network connections, high throughput and reliable delivery of data. However maintaining such high QoS in a WLAN is more difficult than in a wired network. The range and speed of wireless communications is often limited by, for example, interference and power limitations. Maintaining a high QoS in a WLAN therefore requires vigilant attention to error detection and correction and also requires careful monitoring of the conditions of the wireless link.

Despite their limitations, WLANs are frequently preferred over wired LANs, primarily because the user terminals of a WLAN are portable. Such portability makes possible Wireless Vehicle Area Networks (WVANs) and many Wireless Personal Area Networks (WPANs). However WLANs are also popular for other reasons. For example, with WLANs it is easy to use "ad hoc" networks that can be quickly assembled and torn down, and WLANs also may be more economical when compared with the high cost of infrastructure wiring.

The IEEE 802.11 standards concern the operation of a network's Media Access Control (MAC) layer. The MAC layer resides just above a network's Physical (PHY) layer and is responsible for controlling access to the wireless channel. The MAC receives MAC Service Data Units (MSDUs) from the higher layers. MSDU's may be fragmented into smaller MAC Protocol Data Units (MPDUs), which are then transported between network stations across the wireless medium. Network stations are devices connected to the network that may be mobile, portable, or stationary. MPDUs are transmitted between network stations using a carrier sense multiple access with collision avoidance (CSMA/CA) protocol. Collision detection such as that used in the Ethernet protocol cannot be used in wireless transmissions, because when a wireless station is transmitting it cannot hear other stations on the network as its own signal will interfere with any received signal. If all stations, be it subscribers or APs, have equal priority and timing access to the channel via CSMA/CA, then the IEEE 802.11 standards refer to the above method of channel access as the Distributed Coordination Function (DCF).

The 802.11 standards also describe a second channel access method for networks. This method, referred to as the Point Coordination Function (PCF), requires an AP to be present, and it uses polling to provide access to the wireless medium. The AP constructs a polling list that determines the order in which the stations within the network will be polled.

In an IEEE 802.11 network, stations are collected into a Basic Service Set (BSS). A BSS may comprise an ad hoc network where all stations in the network can communicate directly with all other stations. Alternatively a BSS may include an AP in which case it is called an infrastructure BSS. In an infrastructure BSS, all stations communicate exclusively through the AP. The AP is often connected to a wired LAN and therefore can significantly increase the range and resources available to a BSS.

Extensions to the existing IEEE 802.11 protocol include the IEEE 802.11(e) QoS extensions. These are based on both the CSMA/CA channel access method and on the polling method. In an infrastructure BSS that is providing QoS, a QoS AP (QAP) must schedule all data downlinks to all stations in the BSS and all data uplinks from the stations to the QAP. To avoid delay and jitter, all uplinks and downlinks must be scheduled efficiently. Optimizing such scheduling using a scheduling algorithm is often a complex process that requires consideration of numerous variables such as the specific QoS requirements of individual stations, fading disruptions, processing time, variable queuing time, and the load of individual stations (i.e., the amount of data queued at a station waiting to be uplinked to the QAP).

Additional variables need to be considered when scheduling multicast data traffic. In a multicast environment, only one member of a many-to-many multicast group is able to operate as a data traffic source at any given time. Often such multicast groups involve half-duplex group voice communications requiring "push-to-talk-release-to-listen" switches. For example, emergency response teams such as police and firefighters may use half-duplex voice over IP (VoIP) communications equipment to multicast a dispatch call to all team members and then to receive a response from a single team member. These multicast communications work on top of Transmission Control Protocol/Internet Protocol (TCP/IP) based networks, and use multicast routers to transmit IP packets to multiple destinations.

In a half-duplex group voice communication network, at any given time, generally only one member of the group can be an active transmitter. Further, the active group member who has the authority to transmit must often change rapidly from one member to another. Identifying the active group member who has the authority to transmit, as part of a multicast scheduling process, is generally done by polling. Such polling includes the Request to Send/Clear to Send (RTS/CTS) procedures that are described in the 802.11 standard. However, the RTS/CTS procedures define a four-way handshake that results in higher overhead, because two extra packets are required to be transmitted for each payload. Further, such overhead is multiplied when intermediate stations must act as relay points, such as in many WVANs. Other solutions for transmission scheduling include Time-Division Multiplexing (TDM)/reservation techniques that are complex, and which are generally undesirable as they do not form part of the 802.11 standard. There is therefore a need for an improved method and system for minimizing polling overhead by reducing the required number of RTS/CTS packets.

SUMMARY OF THE INVENTION

According to one aspect, the present invention is therefore a method for wireless data transmission between at least three stations. The method includes transmitting a Request To Send (RTS) packet from a first station to an intermediate second station over a first frequency band. Two Clear To Send (CTS) packets, which include transmission timing information, are then transmitted from the second station simultaneously both to the first station and to a third station. The CTS packet sent to the first station is transmitted over the first frequency band and the CTS packet sent to the third station is transmitted over a second frequency band. A data packet from the first station is then transmitted to the second station. The third station suspends, based on the transmission timing information included in the CTS packets, any unicast transmission to the second station during the transmission of the data packet from the first station to the second station.

According to another aspect, the invention is a system for wireless data transmission. The system includes a first wireless station, an intermediate second wireless station, and a third wireless station. An RTS packet is transmitted from the first station to the intermediate second station over a first frequency band. Two CTS packets, which include transmission timing information, are then transmitted from the second station simultaneously both to the first station and to the third station. The CTS packet sent to the first station is transmitted over the first frequency band and the CTS packet sent to the third station is transmitted over a second frequency band. A data packet is then transmitted from the first station to the second station. The third station suspends, based on the transmission timing information included in the CTS packets, any unicast transmission to the second station during the transmission of the data packet from the first station to the second station.

BRIEF DESCRIPTION OF THE DRAWINGS

In order that the invention may be readily understood and put into practical effect, reference will now be made to a preferred embodiment as illustrated with reference to the accompanying drawings, wherein like reference numbers refer to like elements, in which:

FIG. 1 is a schematic diagram illustrating a WLAN involving multicast traffic streams;

FIG. 2 is a schematic diagram illustrating a WLAN and various types of data traffic;

DETAILED DESCRIPTION OF THE PREFERRED EMBODIMENTS

Referring to FIG. 1, there is a schematic diagram illustrating a WLAN 100 involving multicast traffic streams between a QAP 105 and various QoS STAs (QSTAs) 110. In the WLAN 100 multicast traffic is classified as either inbound or outbound. In a typical group voice application, the role of the QAP 105 is to relay inbound or outbound multicast voice traffic and forward the traffic over a backbone or air interface according to an Open Systems Interconnection (OSI) level 2 spanning tree. (OSI levels are well known in the art and therefore are not described in further detail here.) For example, each QSTA 110 could correspond to a member of an emergency response team and a dispatch call could be multicast from the QAP 105 to each team member. IP packets sent across an outbound multicast interface 120 may have originated internally within the WLAN 100, or may have originated externally and were delivered to the QAP 105 across a backhaul interface 125.

In a group voice application such as a WLAN 100 for an emergency response team as described above, each QSTA 110 (corresponding to a team member in this case) sends a unicast message to a call processing unit (not shown in the figures) to indicate that the QSTA 110 is part of a specific multicast group, and that the multcast group exists at and communicates through a specific QAP 105. Such unicast messages are generally out of band, meaning that they are not part of the same transmission sessions used for the multicast group voice transmissions. The call processing unit handles group admission control, resource management, security policies, address assignments, etc., at the system level as well as at the air interface level. Note that the unicast message to the call processor is one method of indicating group voice application participation. Other methods exist, such as multicast messaging to a gateway, and so forth. The present invention is not limited to only the first case.

Referring to FIG. 2, there is a schematic diagram illustrating a WLAN 100 and various types of data traffic such as multicast voice traffic, unicast voice traffic, and video traffic that may need to be managed by the QAP 105. Assuming that a general OSI level 3 multicast protocol has been implemented, each QSTA 110 participating in a multicast group must register with appropriate routers in a multicast path. OSI level 2 also operates with a reserved address sub-space for multicast traffic. A mapping exists between each OSI level 3 and OSI level 2 multicast addresses, which thus defines a mapping between OSI level 3 and OSI level 2 multicast groups. Based on this information, inbound multicast packets are forwarded by an OSI level 2 forwarding engine to the relevant outbound multicast interface 120.

Figure 3:
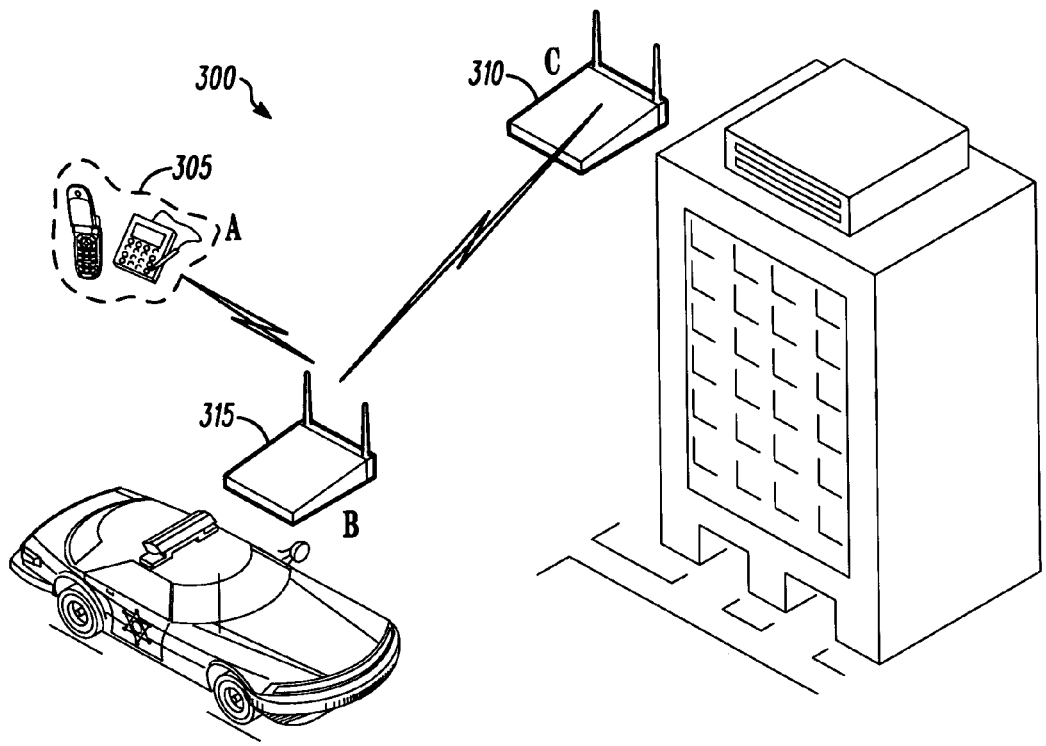
FIG. 3 is a schematic diagram of a Wireless Vehicle Area Network (WVAN) including three primary stations, according to an embodiment of the present invention.

Referring to FIG. 3, there is a schematic diagram of a Wireless Vehicle Area Network (WVAN) 300 including three primary stations. The first station is illustrated as a Wireless Personal Area Network (WPAN) 305, including devices such as a Personal Digital Assistant (PDA). The WPAN 305 communicates with a second intermediate station, shown as a mobile AP 315 in a police car, which in turn communicates with a third station, shown as an infrastructure AP 310. The intermediate mobile AP 315 thus acts as a relay between the WPAN 305 and the infrastructure AP 310. In the absence of effective transmission scheduling, the mobile AP 315, when transmitting to the WPAN 305, may miss transmissions from the infrastructure AP 310—and vice versa. However, the method and system of the present invention provides for effective transmission scheduling in these and similar circumstances—such as meshed network applications—without requiring modifications to the 802.11 standards.

Figure 4:
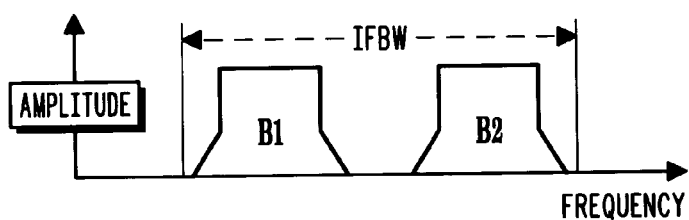
FIG. 4 is a graph of amplitude v. frequency that illustrates features of an embodiment of the present invention.

Referring to FIG. 4, there is a graph of amplitude v. frequency that illustrates features of an embodiment the present invention. Each of the devices shown in FIG. 3 would generally be assigned an Intermediate Frequency BandWidth (IFBW) that spans a particular frequency range, within which the devices must operate. As shown in FIG. 4, a method of the present invention defines two smaller frequency bands, channels B1 and B2, which both fit inside of such an IFBW and do not overlap. Referring again to FIG. 3, a mobile AP 315 may then transmit simultaneously over both B1 and B2. However, other devices are limited to transmitting unicast packets over only one of the smaller frequency bands of the WFBW. So, for example, the WPAN 305 might transmit only over channel B1; and the infrastructure AP 310 might transmit only over channel B2. That enables the mobile AP 315 to simultaneously receive data from both the WPAN 305 and the infrastructure AP 310. As long as the mobile AP 315 is not transmitting, it would be able to decode packets simultaneously received from both the WPAN 305 and the infrastructure AP 310. Those skilled in the art will recognize that the two smaller frequency bands of the present invention (such as two 5 MHz channels) also provides superior performance over a single wider frequency band (such as one 10 MHz channel) because narrow channels offer more range. Also, the dual frequency bands allow legacy subscribers and legacy infrastructure access points to operate with a modified vehicular device. That is because a legacy device will operate only over the channel to which it is configured. A modified vehicular device will then send appropriate messaging only over that channel.

Figure 5:
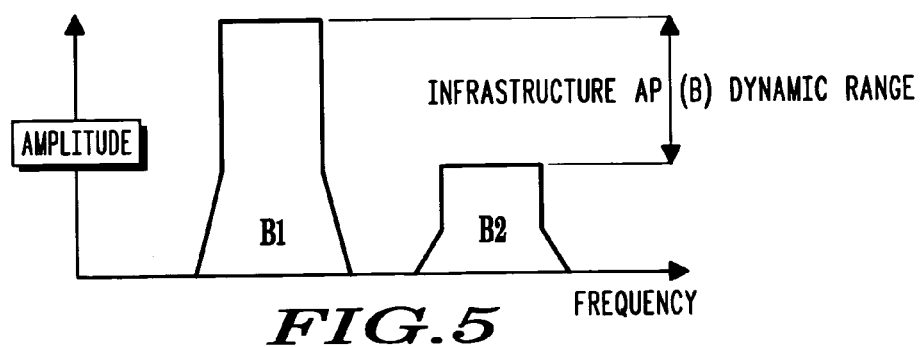
FIG. 5 is a graph of amplitude v. frequency that illustrates the use of transmit power control according to an embodiment of the present invention.

According to the present invention, a Transmit Power Control (TPC) mechanism may be required in some stations such as the WPAN 305 devices. That enables the devices to adjust their average transmit power so that the amplitude of a signal from the WPAN 305 received at the mobile AP 315 does not exceed the amplitude of a signal from the infrastructure AP 310, received at the mobile AP 315, by more than the dynamic range of a receiver at the mobile AP 315. That concept is illustrated in the amplitude v. frequency graph shown in FIG. 5.

Figure 6:
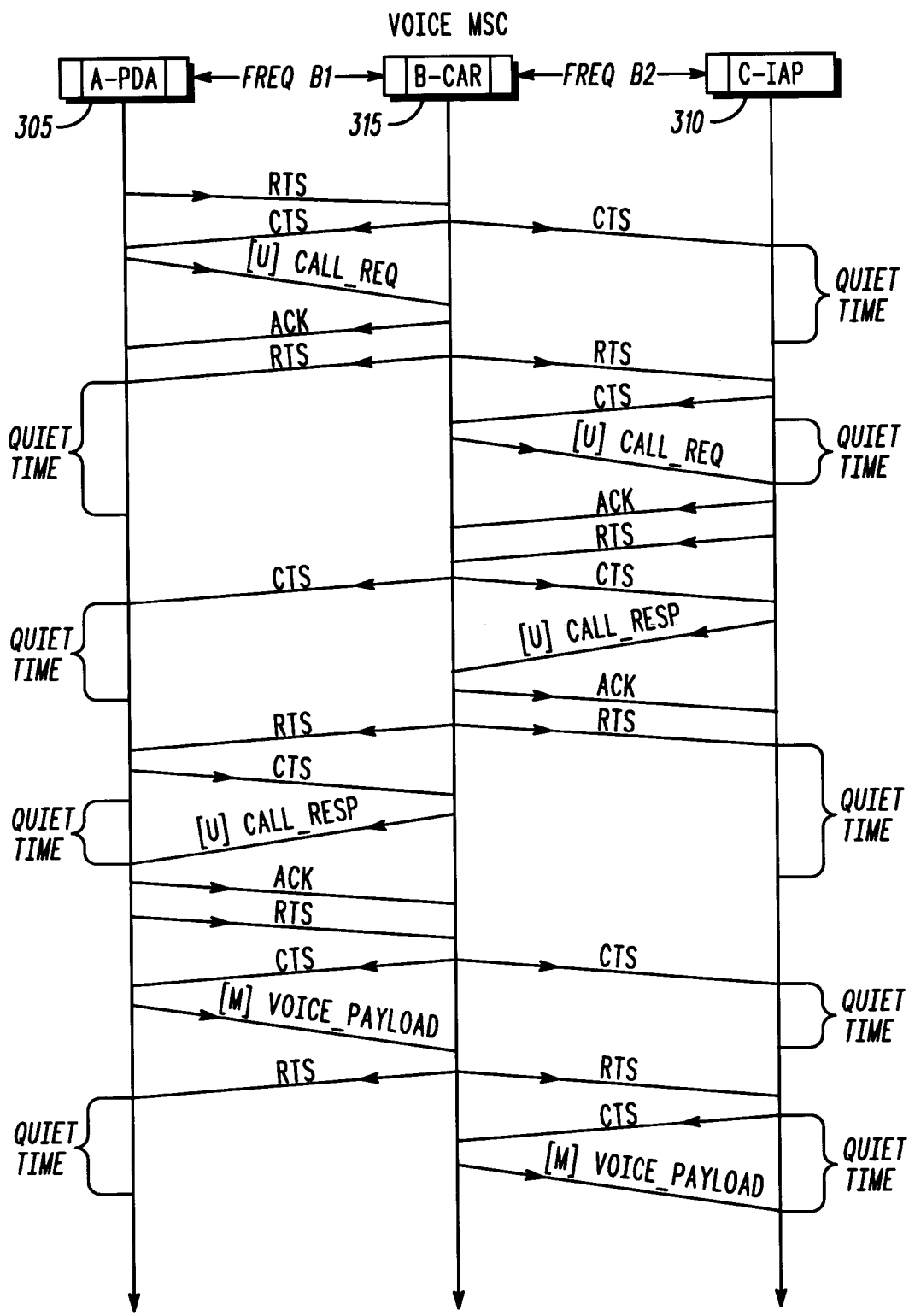
FIG. 6 is a Message Sequence Chart (MSC) illustrating a voice procedure according to an embodiment of the present invention.

Referring to FIG. 6, there is a Message Sequence Chart (MSC) illustrating a voice procedure according to an embodiment of the present invention. For example, assume that first the WPAN 305 transmits an RTS packet to the mobile AP 315 using channel B1. Transmission timing information is included, for example, in a duration field in the RTS packet that indicates the length of time needed for the transmission. The mobile AP 315 then transmits simultaneously two Frequency Division Multiplexed CTS packets, one on each of channels B1 and B2, where the CTS packets include the same duration field as the RTS packet. (Of course, the CTS packets would not be sent if the mobile AP 315 is busy transmitting to another device. In that case the WPAN 305 would queue its data packet and apply RTS retries further to the 802.11 standard.) The WPAN 305 then transmits on channel B1 a unicast call request ([U] Call_Req) to the mobile AP 315. During that transmission, the infrastructure AP 310 knows to remain quiet (i.e., suspend transmissions) for the period defined in the duration field of the RTS packet, because the infrastructure AP 310 received the same duration field in the CTS packet.

The mobile AP 315 then transmits an Acknowledgement (ACK) packet back to the WPAN 305 over channel B1. Next, the mobile AP 315 transmits simultaneously two Frequency Division Multiplexed RTS packets, one on each of channels B1 and B2, where the RTS packets include a duration field. After receiving a CTS packet over channel B2 from the infrastructure AP 310, the mobile AP 315 forwards the unicast call request to the infrastructure AP 310. Here, the WPAN 305 knows to remain quiet for the period defined in the duration field of the RTS packet received from the mobile AP 315.

Similar RTS/CTS transmissions over both B1 and B2 are then repeated concerning a unicast call response ([U] Call_Resp) from the infrastructure AP 310, and finally concerning a multicast voice payload ([M] Voice_Payload) from the WPAN 305. Also, as with many existing WLAN products, if a packet is very short then the RTS/CTS transmissions do not need to be utilized.

Figure 7:
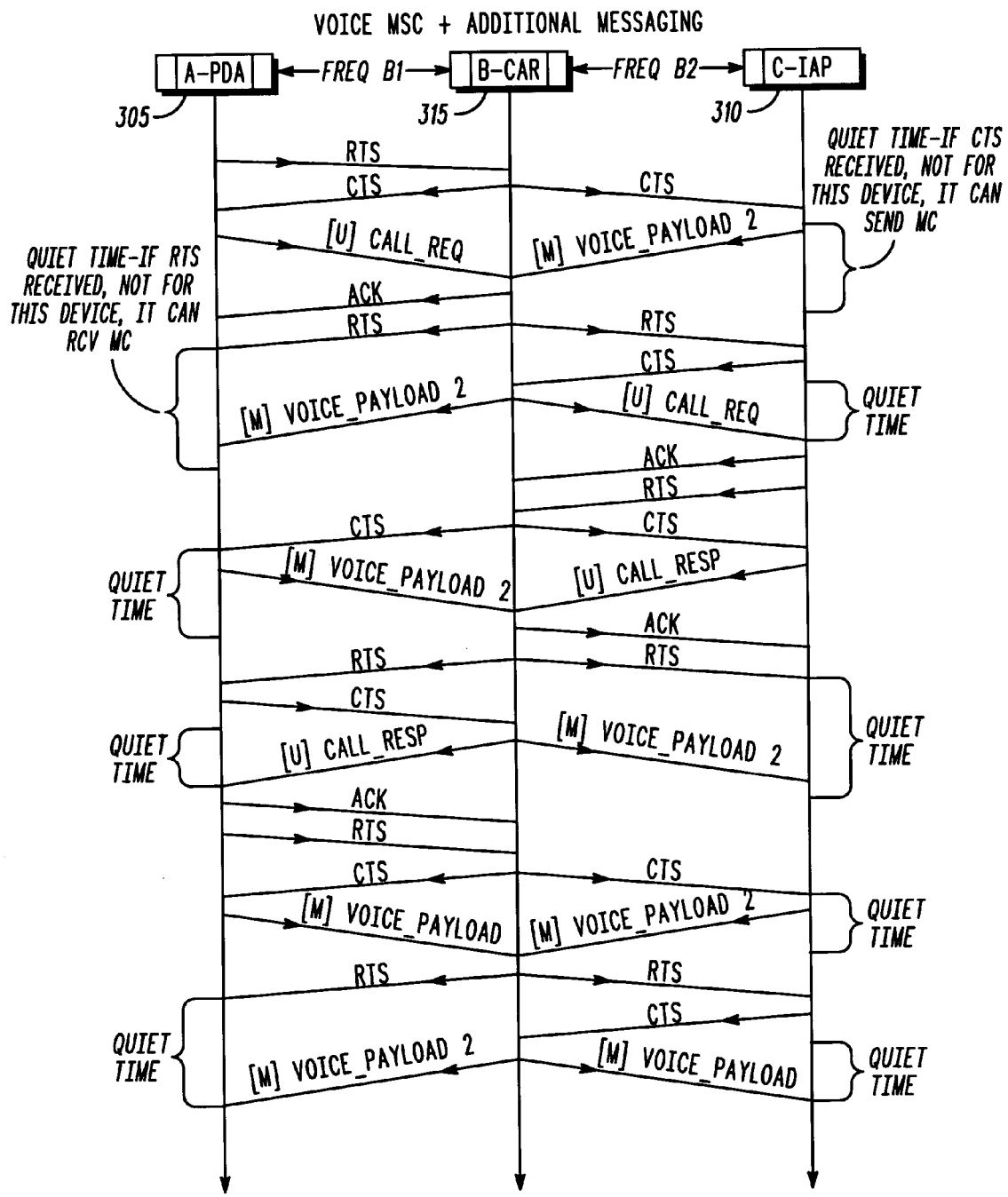
FIG. 7 is an MSC illustrating a voice procedure including additional MultiCast/BroadCast (MC/BC) messaging according to an embodiment of the present invention.

Referring to FIG. 7, there is an MSC illustrating a voice procedure including additional MultiCast/BroadCast (MC/BC) messaging, according to an embodiment of the present invention. The initial RTS transmission from the WPAN 305 to the mobile AP 315 over channel B1, and the CTS transmissions from the mobile AP 315 over both channels B1 and B2, proceed as in FIG. 6. However, when the unicast call request is transmitted from the WPAN 305 to the mobile AP 315 on channel B1, the infrastructure AP 310 may simultaneously transmit a MC/BC voice payload ([M] Voice_Payload 2) to the mobile AP 315 on channel B2. Similarly, when the unicast call response is transmitted from the infrastructure AP 310 to the mobile AP 315 on channel B2, the WPAN 305 may simultaneously transmit a MC/BC voice payload to the mobile AP 315 on channel B1. MC/BC packets do not require acknowledgments, and therefore there is no need in the above circumstances for the mobile AP 315 to transmit on channels B1 or B2, which transmission could interfere with packet receptions from the infrastructure AP 310 and the WPAN 305, respectively.

Further, those skilled in the art will recognize that the additional MC/BC messaging described above requires that the MC/BC packets be completely received before the unicast packets are completely received and require an acknowledgment. However, using the multichannel RTS/CTS mechanism described above that includes transmission timing information, a station transmitting an MC/BC packet will know whether there is enough time to transmit the MC/BC packet before transmission of the unicast packet is completed.

As illustrated in the lower half of the MSC of FIG. 7, the mobile AP 315 may also simultaneously transmit unicast data on channel B1 and multicast data on B2, or vice versa. Also, the mobile AP 315 may receive first multicast data over B1 and simultaneously receive second multicast data over B2. Also, the mobile AP 315 may transmit different multicast data simultaneously over both channels B1 and B2.

Figure 8:
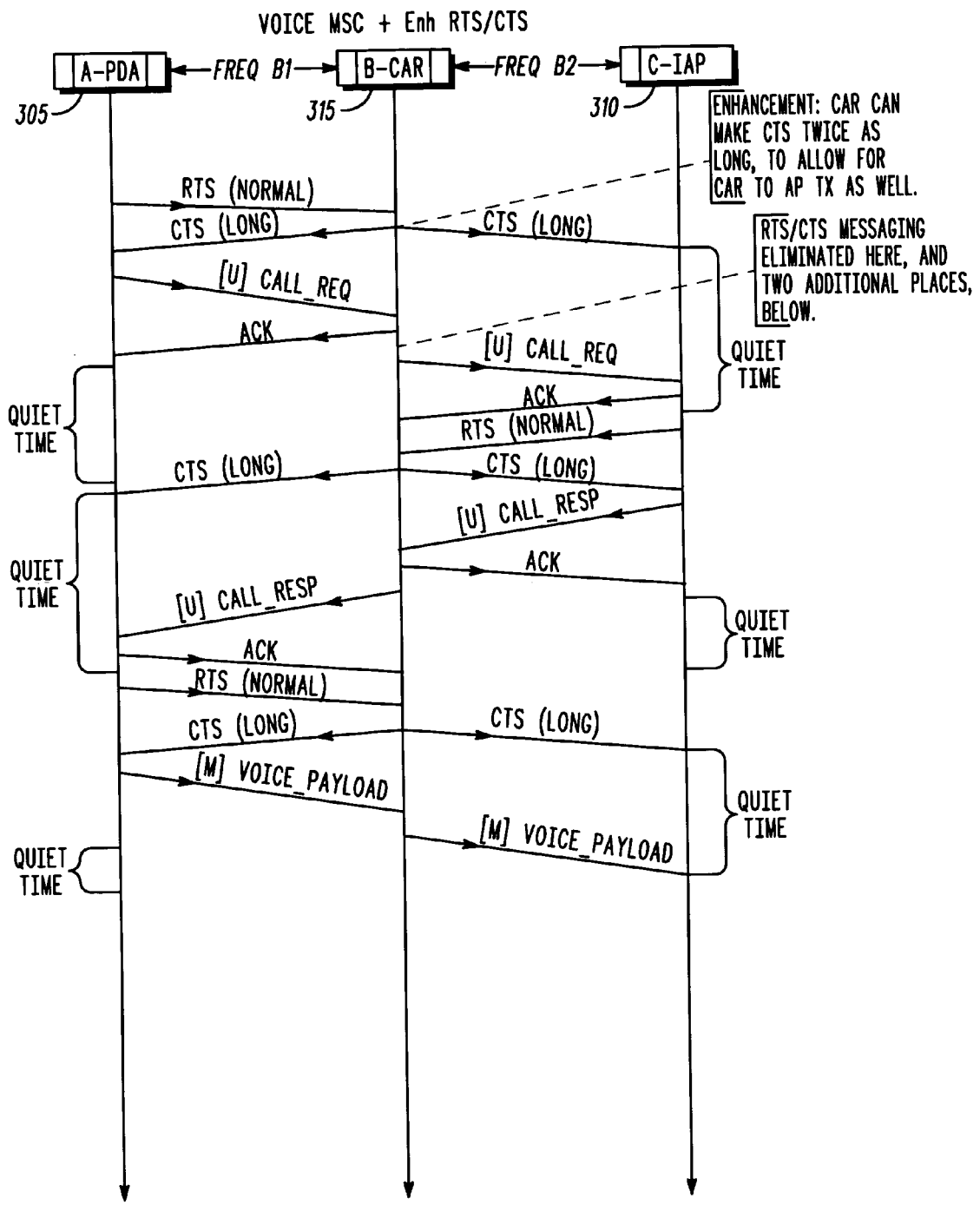
FIG. 8 is an MSC illustrating a voice procedure including enhanced RTS/CTS procedures, according to an embodiment of the present invention.

Referring to FIG. 8 there is an MSC illustrating a voice procedure including enhanced RTS/CTS procedures, according to another embodiment of the present invention. For example, the initial RTS transmission from the WPAN 305 to the mobile AP 315 over channel B1 proceeds as described above with reference to FIG. 6. However, according to an enhanced RTS/CTS procedure, the mobile AP 315 increases the value of the duration field in the CTS to allow for the unicast call request ([U] Call_Req) to be sent both from the WPAN 305 and from the mobile AP 315. That is illustrated by the extended "quiet time" for the infrastructure AP 310 shown in the upper right of FIG. 8. Also, such an enhanced procedure enables the second RTS/CTS messaging sequence, between receipt of the unicast call request at the mobile AP 315 and transmission of the unicast call request from the mobile AP 315, to be eliminated. That is because both the WPAN 305 and the infrastructure AP 310 are aware of the duration of the unicast call request data packets and can adhere to the appropriate quiet times. The lower half of FIG. 8 also illustrates the use of similar long duration fields in CTS packets corresponding to the unicast call response packets and the multicast voice payload packets.

When a subscriber such as a mobile AP 315 roams, it will detect a new infrastructure AP 310 using techniques associated with conventional 802.11 systems. Further, due to convention, after the new infrastructure AP 310 is detected, the mobile AP 315 will know that an adjacent frequency (generally to the left of an infrastructure AP 310 frequency) will be a WVAN band. Because all the WVANs associated with a particular infrastructure AP 310 will have the same frequency, stations executing the procedures of the present invention will not suffer from co-channel interference from adjacent WVANs. While it is generally accepted that the WVAN channel is to the left of the AP frequency, it could be to the right, as long as it is contiguous. The present invention is not limited in this regard. The WVAN/AP frequency relationship may be a configuration element for the system, or other mechanisms may determine the relationship.

Figure 9:
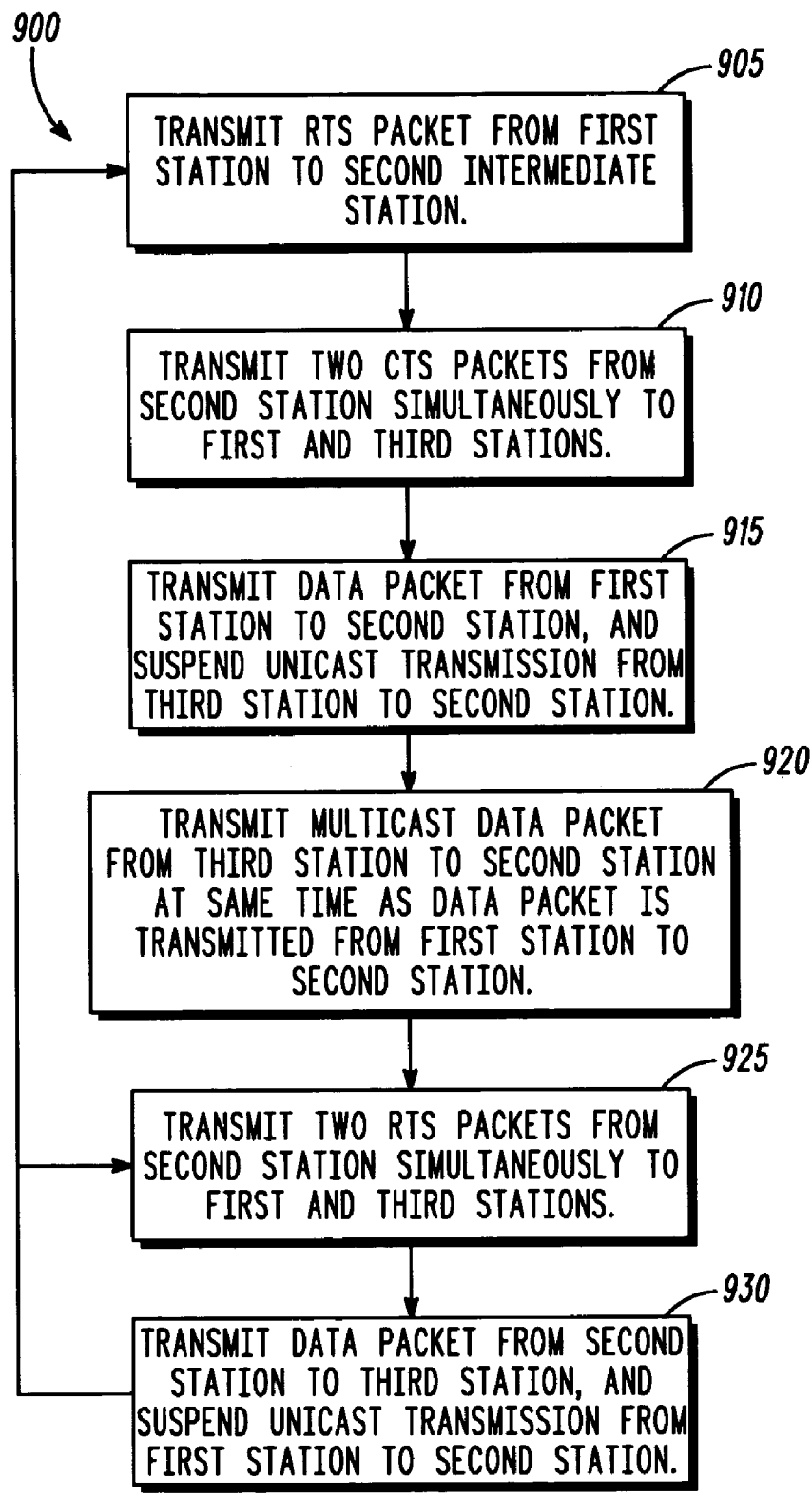
FIG. 9 is a flow diagram illustrating general steps of a method according to an embodiment of the present invention.

Referring to FIG. 9, there is a flow diagram illustrating the general steps of a method 900 according to one embodiment of the present invention. First, at step 905, an RTS packet is transmitted from a first station to a second station over a first frequency band. Next, at step 910, two CTS packets, which CTS packets include transmission timing information, are transmitted from the second station simultaneously to both the first station and to a third station. The CTS packet sent to the first station is transmitted over the first frequency band and the CTS packet sent to the third station is transmitted over a second frequency band. At step 915, a data packet from the first station is transmitted to the second station. The third station suspends, based on the transmission timing information included in the CTS packets, any unicast transmission to the second station during the transmission of the data packet from the first station to the second station. At step 920, a multicast data packet is transmitted from the third station to the second station at the same time as the data packet is transmitted from the first station to the second station Next, at step 925, two RTS packets, which RTS packets include transmission timing information, are transmitted from the second station simultaneously to both the first station and to the third station. The RTS packet sent to the first station is transmitted over the first frequency band and the RTS packet sent to the third station is transmitted over the second frequency band. Finally, at step 930, a data packet is transmitted from the second station to the third station. The first station suspends, based on the transmission timing information included in the RTS packet received from the second station, any unicast transmission to the second station during the transmission of the data packet from the second station to the third station. The method 900 then returns to either step 905 or 925, depending on which station has queued data for transmission. Those skilled in the art will recognize that the method 900 is simply mirrored for transmissions from the third station to the first station through the intermediate second station. Alternatively, the method 900 is simply repeated for relayed transmissions from the third station to a fourth station, etc.

In summary, the present invention provides medium access control for simultaneous half-duplex channel communications. By defining two narrow frequency bands as adjacent channels inside an WFBW, the invention enables the concurrent and simultaneous decoding of signals from two different transmitters that are Frequency Division Multiplexed. Also, one transmitter can simultaneously signal two different receivers that are adjacently Frequency Division Multiplexed.

Advantages of particular embodiments of the present invention include the following: no changes are required to the IEEE 802.11 standards; the narrower frequency bands of the present invention provide for greater range; no synchronization is required between stations; all stations can operate in half-duplex mode and require only a single transmitter and a single receiver; stations consisting of legacy devices do not require any modification; and the invention is applicable to both infrastructure deployments and meshed network applications.

The above detailed description provides a preferred exemplary embodiment only, and is not intended to limit the scope, applicability, or configuration of the present invention. Rather, the detailed description of the preferred exemplary embodiment provides those skilled in the art with an enabling description for implementing the preferred exemplary embodiment of the invention. It should be understood that various changes can be made in the function and arrangement of elements and steps without departing from the spirit and scope of the invention as set forth in the appended claims.

We claim:

1. A method for wireless data transmission between at least three stations, the method comprising the steps of:
   transmitting a Request To Send (RTS) packet from a first station to an intermediate second station over a first frequency band;
   transmitting two Clear To Send (CTS) packets, which CTS packets include transmission timing information, from the second station simultaneously both to the first station and to a third station, wherein the CTS packet sent to the first station is transmitted over the first frequency band and the CTS packet sent to the third station is transmitted over a second frequency band; and
   transmitting a data packet from the first station to the second station, wherein the third station suspends, based on the transmission timing information included in the CTS packets, any unicast transmission to the second station during the transmission of the data packet from the first station to the second station.

2. The method according to claim 1, wherein a multicast data packet is transmitted from the third station to the second station at the same time as the data packet is transmitted from the first station to the second station.

3. The method according to claim 1, wherein the transmission timing information included in the CTS packets indicates to the third station to suspend unicast transmission to the second station for an extended time period, during which time period the data packet is received at the second station and also transmitted to the third station.

4. The method according to claim 1, further comprising the steps of:
   transmitting two RTS packets, which RTS packets include transmission timing information, from the second station simultaneously both to the first station and to the third station, wherein the RTS packet sent to the first station is transmitted over the first frequency band and the RTS packet sent to the third station is transmitted over the second frequency band;
   transmitting a data packet from the second station to the third station, wherein the first station suspends, based on the transmission timing information included in the RTS packet received from the second station, any unicast transmission to the second station during the transmission of the data packet from the second station to the third station.

5. The method according to claim 1, wherein the first and second frequency bands fit inside an Intermediate Frequency BandWidth (IFBW) and do not overlap.

6. The method according to claim 1, wherein each station is a member of the group consisting of: mobile Access Points (APs), infrastructure Access Points (APs), Wireless Personal Area Networks (WPANs), and meshed network stations.

7. The method of claim 1, wherein the three stations comprise part of a Wireless Vehicle Area Network (WVAN).

8. The method according to claim 1, wherein the data packets comprise voice data.

9. The method according to claim 1, wherein one of the stations is a legacy infrastructure access point.

10. The method according to claim 1, wherein at least one of the stations includes a Transmit Power Control feature.

11. A system for wireless data transmission, comprising:
a first wireless station;
an intermediate second wireless station; and
a third wireless station;
wherein a Request To Send (RTS) packet is transmitted from the first station to the intermediate second station over a first frequency band;
wherein two Clear To Send (CTS) packets, which CTS packets include transmission timing information, are transmitted from the second station simultaneously both to the first station and to the third station, wherein the CTS packet sent to the first station is transmitted over the first frequency band and the CTS packet sent to the third station is transmitted over a second frequency band; and
wherein a data packet is transmitted from the first station to the second station, the third station suspending, based on the transmission timing information included in the CTS packets, any unicast transmission to the second station during the transmission of the data packet from the first station to the second station.

12. The system according to claim 11, wherein a multicast data packet is transmitted from the third station to the second station at the same time as the data packet is transmitted from the first station to the second station.

13. The system according to claim 11, wherein the transmission timing information included in the CTS packets indicates to the third station to suspend unicast transmission to the second station for an extended time period, during which time period the data packet is received at the second station and also transmitted to the third station.

14. The system according to claim 11, wherein two RTS packets, which RTS packets include transmission timing information, are transmitted from the second station simultaneously both to the first station and to the third station, the RTS packet sent to the first station is transmitted over the first frequency band and the RTS packet sent to the third station is transmitted over the second frequency band; and wherein a data packet is transmitted from the second station to the third station, the first station suspending, based on the transmission timing information included in the RTS packet received from the second station, any unicast transmission to the second station during the transmission of the data packet from the second station to the third station.

15. The system according to claim 11, wherein the first and second frequency bands fit inside an Intermediate Frequency BandWidth (IFBW) and do not overlap.

16. The system according to claim 11, wherein each station is a member of the group consisting of: mobile Access Points (APs), infrastructure Access Points (APs), Wireless Personal Area Networks (WPANs), and meshed network stations.

17. The system according to claim 11, wherein the three stations comprise part of a Wireless Vehicle Area Network (WVAN).

18. The system according to claim 11, wherein at least one of the stations includes a Transmit Power Control feature.

19. The system according to claim 11, wherein one of the stations is a legacy infrastructure access point.

20. A system for wireless data transmission, comprising:
means for transmitting a Request To Send (RTS) packet from a first station to an intermediate second station over a first frequency band;
means for transmitting two Clear To Send (CTS) packets, which CTS packets include transmission timing information, from the second station simultaneously to both the first station and to a third station, wherein the CTS packet sent to the first station is transmitted over the first frequency band and the CTS packet sent to the third station is transmitted over a second frequency band; and
means for transmitting a data packet from the first station to the second station, wherein the third station suspends, based on the transmission timing information included in the CTS packets, any unicast transmission to the second station during the transmission of the data packet from the first station to the second station.

21. A method for wireless data transmission between at least three stations, the method comprising the steps of:
transmitting a Request To Send (RTS) packet from a first station to an intermediate second station over a first frequency band;
transmitting two Clear To Send (CTS) packets, which CTS packets include transmission timing information, from the second station simultaneously both to the first station and to a third station, wherein the CTS packet sent to the first station is transmitted over the first frequency band and the CTS packet sent to the third station is transmitted over a second frequency band;
transmitting a data packet from the first station to the second station, wherein the third station suspends, based on the transmission timing information included in the CTS packets, any unicast transmission to the second station during the transmission of the data packet from the first station to the second station; and
transmitting a multicast data packet from the third station to the second station at the same time as the data packet is transmitted from the first station to the second station.

22. A system for wireless data transmission, comprising:
a first wireless station;
an intermediate second wireless station; and
a third wireless station;
wherein a Request To Send (RTS) packet is transmitted from the first station to the intermediate second station over a first frequency band;
wherein two Clear To Send (CTS) packets, which CTS packets include transmission timing information, are transmitted from the second station simultaneously both to the first station and to the third station, wherein the CTS packet sent to the first station is transmitted over the first frequency band and the CTS packet sent to the third station is transmitted over a second frequency band;
wherein a data packet is transmitted from the first station to the second station, the third station suspending, based on the transmission timing information included in the CTS packets, any unicast transmission to the second station during the transmission of the data packet from the first station to the second station; and wherein a multicast data packet is transmitted from the third station to the second station at the same time as the data packet is transmitted from the first station to the second station.

* * * * *